(12) United States Patent
Ouvray et al.

(10) Patent No.: US 12,344,042 B2
(45) Date of Patent: Jul. 1, 2025

(54) TIRE FOR AN AGRICULTURAL VEHICLE

(71) Applicant: COMPAGNIE GENERALE DES ETABLISSEMENTS MICHELIN, Clermont-Ferrand (FR)

(72) Inventors: Delphine Ouvray, Clermont-Ferrand (FR); Philippe Brochet, Clermont-Ferrand (FR); Catherine Houis, Clermont-Ferrand (FR); Patrick Vervaet, Clermont-Ferrand (FR); Gabriel Veniant, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 17/769,120

(22) PCT Filed: Oct. 13, 2020

(86) PCT No.: PCT/FR2020/051807
§ 371 (c)(1),
(2) Date: Apr. 14, 2022

(87) PCT Pub. No.: WO2021/074517
PCT Pub. Date: Apr. 22, 2021

(65) Prior Publication Data
US 2024/0270025 A1    Aug. 15, 2024

(30) Foreign Application Priority Data
Oct. 16, 2019    (FR) .................................... 1911506

(51) Int. Cl.
*B60C 11/03*    (2006.01)

(52) U.S. Cl.
CPC ........ *B60C 11/033* (2013.01); *B60C 11/0302* (2013.01); *B60C 2011/0313* (2013.01)

(58) Field of Classification Search
CPC .................................................. B60C 11/0318
See application file for complete search history.

(56) References Cited

U.S. PATENT DOCUMENTS

| | | |
|---|---|---|
| 3,603,370 A | 9/1971 | Hylbert et al. |
| 4,383,567 A | 5/1983 | Crum et al. |
| (Continued) | | |

FOREIGN PATENT DOCUMENTS

| | | |
|---|---|---|
| EP | 0162003 A2 | 11/1985 |
| EP | 0442427 A1 | 8/1991 |
| (Continued) | | |

OTHER PUBLICATIONS

International Search Report dated Nov. 23, 2020, in corresponding PCT/FR2020/051807 (4 pages).

*Primary Examiner* — Katelyn W Smith
*Assistant Examiner* — Nicholas J Weiler
(74) *Attorney, Agent, or Firm* — VENABLE LLP (57) ABSTRACT

The tread pattern of a tire for a vehicle for agricultural use comprises two rows of lugs (R1, R2), a first row being made up of a circumferential distribution of at least two families of lugs, over one revolution of the wheel; a first family is reproduced with a shortest spacing S, and a second family is reproduced with a longest spacing L; the tread pattern of the tread is designed such that the distance between the axially outer end of a following lug and the axially inner end at the centre of the tread is referred to as the overlap distance R. The ratio of the shortest spacing S of the family of lugs to the longest spacing L, "S/L", lies in the range [0.6; 0.8]. The circumferential overlap distance R between the first and (Continued)

second circumferential rows of lugs is constant around the entire circumference of the tire.

7 Claims, 4 Drawing Sheets

(56) References Cited

U.S. PATENT DOCUMENTS

| | | | |
|---|---|---|---|
| 4,446,902 | A | 5/1984 | Madec et al. |
| 4,534,392 | A | 8/1985 | Bonko et al. |
| 5,056,573 | A | 10/1991 | O'Brien et al. |
| 5,733,394 | A | 3/1998 | Baus et al. |
| 5,843,248 | A * | 12/1998 | Baus ................. B60C 11/0318 152/209.1 |
| 6,363,984 | B1 * | 4/2002 | Morgan ............. B60C 11/0318 152/209.2 |
| 6,651,712 | B1 * | 11/2003 | Sundkvist .......... B60C 11/0318 152/209.2 |
| 2011/0240191 | A1 * | 10/2011 | Sakamoto .......... B60C 11/0306 152/209.2 |
| 2018/0290489 | A1 * | 10/2018 | Mangeret .............. C08K 5/09 |

FOREIGN PATENT DOCUMENTS

| | | | |
|---|---|---|---|
| EP | 0795427 | A1 | 9/1997 |
| EP | 0903249 | A1 | 3/1999 |
| EP | 1831034 | B1 | 5/2008 |

\* cited by examiner

TIRE FOR AN AGRICULTURAL VEHICLE

BACKGROUND

The subject of the present invention is a tyre for an agricultural vehicle such as a tractor. Its subject is more particularly the tread pattern of the tread of the tyre, which is intended to come into contact with the ground via a tread surface.

An agricultural tyre has to run over various types of ground such as the more or less compacted soil of the fields, unmade tracks providing access to the fields, and the tarmac surfaces of roads. Bearing in mind the diversity of use, in the fields and on the road, an agricultural tyre and, in particular, the tread thereof needs to offer a performance trade-off that varies according to use. During use in the field, the target performance aspects are essentially effective traction capability, light compaction of the ground and low resistance to forward travel. During road use, the target performance aspects are effective speed capability, low resistance to forward travel, and especially good roadholding.

To satisfy all these performance aspects, the tread of a tyre for an agricultural vehicle generally comprises a plurality of lugs. The lugs are elements that are raised with respect to a surface of revolution about the axis of rotation of the tyre, known as the bottom surface.

A lug generally has an elongate parallelepipedal overall shape made up of at least one rectilinear or curvilinear portion, and is separated from the adjacent lugs by grooves. A lug may be made up of a succession of rectilinear portions, as described, for example, in the documents U.S. Pat. Nos. 3,603,370, 4,383,567, EP 795427, or may have a curvilinear shape, as set out in the documents U.S. Pat. No. 4,446,902, EP 903249, EP 1831034.

A lug usually, but not necessarily, has a mean inclination angle with respect to the circumferential direction of close to 45°. Specifically, this mean inclination angle allows in particular a good trade-off between traction in the field and vibrational comfort. Traction in the field is better if the lug is more axial, that is to say if its mean inclination angle with respect to the circumferential direction is close to 90°, whereas vibrational comfort is better if the lug is more circumferential, that is to say if its mean inclination angle with respect to the circumferential direction is close to 0°. It is a well-known fact that traction in the field is more greatly determined by the angle of the lug in the shoulder region, and this has led certain tyre designers to offer a very curved lug shape, leading to a lug that is substantially axial at the shoulder and substantially circumferential in the middle of the tread.

In the radial direction, a lug extends from the bottom surface as far as the tread surface, the radial distance between the bottom surface and the tread surface defining the lug height. The radially outer face of the lug, which belongs to the tread surface and comes into contact with the ground as the lug enters the contact patch in which the tyre is in contact with the ground, is known as the contact face of the lug. The lug portion in the vicinity of the bottom surface is known as the lug base. By definition, the equatorial plane is a circumferential plane, perpendicular to the axis of rotation of the tyre and passing through the middle of the tread thereof.

The thickness of the lug is the mean of the thicknesses measured on the tread surface at the axially outer and inner ends and at the centre of the lug. The thicknesses are measured on the tread surface orthogonally to the mean curve of the tread surface.

In the following text, an axially inner lug portion will be referred to as lug nose, and an axially outer lug portion will be referred to as lug wing. A family of lugs is a set of lugs with the same geometry (height, length, thickness, distribution spacing over one revolution of the wheel). A tread pattern element extends across the entire axial width of the tread and comprises two lugs that are symmetric with respect to the equatorial plane and are offset in the circumferential direction.

The tread of a tyre for an agricultural vehicle generally comprises two rows of lugs as described above, exhibiting symmetry with respect to the equatorial plane of the tyre. This distribution of lugs that are inclined with respect to the circumferential direction gives the tread a V shape, commonly referred to as a chevron pattern. Usually, there is a circumferential offset between the two rows of lugs, resulting from a rotation about the axis of the tyre. Moreover, the lugs may be continuous or discontinuous, and may be distributed circumferentially with a spacing that is constant or variable.

Good roadholding manifests itself in driving comfort or pleasure perceived by the user inside the vehicle. This comfort is linked with the capacity of the tyre to absorb irregularities in the ground so as to filter out mechanical and acoustic vibrations perceived by the user.

Conventionally, the comfort performance comprises four aspects: vertical comfort, contact, body hum and non-uniformity. For agricultural tyres, it is mainly body hum and non-uniformity which are the comfort components that have the greatest impact on driving pleasure.

Body hum occurs when running in a straight line at a constant speed on a road with a coating of macro-rough type, that is to say comprising irregularities of around 4 mm distributed over a distance of 50 mm. Body hum is therefore an acoustic nuisance perceived inside the running vehicle; it should be distinguished from noise external to the vehicle, which represents the nuisance perceived by local residents.

Lastly, non-uniformity manifests itself on roads of excellent flatness at a stable speed where the nuisance felt is in the form of vibrations in the steering wheel, the seats and the floor of the vehicle.

More specifically, of the tyre sizes covered by the invention, some are intended to be fitted on the rear axles of agricultural vehicles and have, after being mounted on the rim and inflated, outside diameters of between 1.75 m and 2.15 m. In general, the number of lugs is usually between 15 and 25 for a circumferential row of lugs, this corresponding, for the entire tread comprising two circumferential rows of lugs, to a number of between 30 and 50 lugs.

When the vehicle is running on a road, the entry of the lugs into the contact patch brings about hammering of the ground. In the conventional embodiment configurations described above, for a speed of the vehicle of around 50 km/h, the frequency at which the lugs enter the contact patch is therefore between 80 and 130 Hz. The generally aggressive shape of the lugs brings about vibrational loadings at these frequencies.

Furthermore, tractor cabs have a width of generally between 1.3 m and 1.7 m. This generally brings about at least one structural or cavity natural mode of the cab of between 100 and 130 Hz. In addition to the vibrational loadings, the lugs may generate audible nuisances in the cab when a harmonic of the tread pattern enters into resonance with a natural mode of the cab.

The modernization of agricultural vehicles and the increase in the size of farms has led to an increase in road use at high speed and therefore to an increase in the occurrence of these noise problems.

The design features of lugged treads of the prior art do not currently allow an optimal trade-off to be reached between performance in terms of field use, such as traction capability and resistance to forward travel, and performance in terms of road use, such as driving comfort and pleasure.

The inventors set themselves the objective of improving the trade-off between, for the one part, the acoustic comfort or driving pleasure of an agricultural vehicle on a road with an asphalt pavement and, for the other part, its traction capability when it is used in the field.

SUMMARY

This aim has been achieved according to the invention by a tyre for a vehicle for agricultural use, comprising a tread intended to come into contact with the ground via a tread surface:
the tread comprising raised elements, referred to below as lugs, that are separated from one another at least in part by grooves and extend radially towards the outside from a bottom surface as far as the tread surface over a radial height H at least equal to 30 mm and at most equal to the radial thickness $H_{max}$ of the tread;
the lugs being distributed in two circumferential rows (R1, R2);
a first circumferential row (R1) being made up of a circumferential distribution of at least two families of lugs, distributed periodically around the circumference of the tyre;
the lugs of a first family having a circumferential length L1 and being distributed circumferentially with a shortest spacing S, and the lugs of a second family having a circumferential length L2 and being distributed circumferentially with a longest spacing L;
each lug of the first circumferential row (R1) also being inclined at an angle Y with respect to the circumferential direction (XX') of the tyre;
the second circumferential row (R2) being obtained through symmetry of the first circumferential row (R1) with respect to an equatorial plane, passing through the centre of the tread and perpendicular to the axis of rotation (YY') of the tyre, followed by a rotational offset of angle θ about the axis of rotation (YY');
the rotational offset being characterized by an overlap distance (R) between the lugs of the first circumferential row and those of the second circumferential row, defined as being the circumferential distance between the axially outer end of each lug of the first circumferential row (R1) and the axially inner end of the lug of the facing second circumferential row (R2);
the ratio S/L of the shortest spacing S of the first family of lugs divided by the longest spacing L of the second family of lugs lying in the range [0.6; 0.8];
the circumferential overlap distance R between the first and second circumferential rows of lugs being constant around the entire circumference of the tyre.

DETAILED DESCRIPTION

The basic idea of the invention is to design the tread pattern of the tread, that is to say the circumferential distribution of the lugs, so as to avoid the coincidence of the harmonics of the tread pattern excited by the ground with the natural modes of the cab of the tractor mounted on the chassis. The tread pattern of agricultural tyres is formed of inclined lugs with a relatively simple geometry compared with the tread pattern of a tyre for a passenger vehicle. The effort involved in designing the tread pattern will relate to the geometry of the lugs in terms of thickness and length, and with determining the optimal arrangement of the lugs over one revolution of the wheel in relation to the noise generated.

According to a first essential feature of the invention, the ratio S/L of the shortest spacing S of the first family of lugs divided by the longest spacing L of the second family of lugs lies in the range [0.6; 0.8]. The tread pattern comprises at least two families of lugs which are reproduced over one revolution of the wheel at the circumferential spacings S and L. The smallest spacing and the longest spacing are in a ratio ideally equal to 0.7, or at the very least lie in the range [0.6; 0.8].

When the spacing ratio is less than 0.6, the difference between the two spacings becomes too large and causes an excessive discontinuity of the arrangement of the tread pattern elements over one revolution of the wheel.

Conversely, for a spacing ratio above 0.8, the distance between lugs becomes too small, and the tread pattern gets close to a single-spacing solution, which is not satisfactory as regards the level of noise generated. On a tyre size such as the 710/70 R42 size, a spacing ratio equal to 0.7 provides a difference in the spacings L-S of 100 mm. Above 0.8, the difference between L1 and L2 is too small for it to be possible to scramble the acoustic signal. Still on the same size example, a ratio of ratio of 0.8 results in a difference in lengths L-S of 63 mm.

The geometry of the lugs and the repetition spacings are linked. The length L1 of the lug associated with the short spacing S is less than the length L2 of the lug associated with the long spacing L. The shorter the length of the lug, the more the number of lugs around the circumference of the tyre increases and the higher the frequency of repetition of this lug is. The random alternation of the short and long repetition spacings has the effect of scrambling the excitation signal of the tyre on entering and leaving the contact patch. The portions of lugs of the tread pattern that arrive successively at the ground create timed percussion. A tread pattern design which randomly alternates short and long pattern elements avoids the generation of noise referred to as whining.

According to the second essential feature of the invention, the circumferential overlap distance R between the first and second circumferential rows of lugs is constant around the entire circumference of the tyre.

The overlap R is the circumferential distance between the axially outer end of a lug in a row and the axially inner end of a facing lug in the symmetric row. Thus, each lug defines the position of the following symmetric lug.

It is known that the running noise generating mechanisms originate in particular on entering and leaving the contact patch. The lugs of the tread pattern hammer the ground, transmitting radial and tangential vibrations to the sidewalls and to the belt of the tyre and to the vehicle. These vibrations are the origin of an acoustic power which is then radiated to the inside and outside of the vehicle.

With a constant overlap, the tyre remains permanently in contact with the ground over the same quantity of lug portions on entering and leaving the contact patch, this having the effect of avoiding excessively violent hammering and therefore of weakening the excitation function of the tyre.

The combination of the essential features of the invention makes it possible in particular to minimize the level of noise generated by the lugged tread pattern on a road with an asphalt pavement, while maintaining the properties expected for use of the tyre in the fields.

Advantageously, the overlap distance R between the first and second circumferential rows of lugs lies within the range [L/2; L/4]. An overlap of zero would, on passing through the contact patch, bring about contact with the ground at the bottom of the tread pattern in the groove between two lugs. Contact with the ground would be established alternately either on the lug or between two lugs. This hammering with an amplitude equal to the height of the lug would be very detrimental in terms of noise. To minimize the noise generated, the overlap therefore has a minimum value of L/4 and a maximum value of L/2. Typically, on the size 710/70 R42, with a circumference of 6530 mm, the overlap is 189 mm.

In one embodiment of the invention, the rotational angle θ of the second circumferential row (R2) with respect to the first circumferential row (R1) lies within the range [5°; 15°].

By design, each lug of a row forms, with the lug symmetric thereto with respect to the equatorial plane, a tread pattern element that extends across the entire axial width of the tread. The axially outer end or the axially inner end of a lug is positioned such that the overlap distance is constant. In other words, the overlap distance, the rotational angle and the circumference of the tyre are linked. The overlap distance is at a maximum when it amounts to half the longest spacing, this corresponding to about a rotation of 15° for the tyre sizes covered by the invention.

Advantageously, with the lugs of the first family having a mean thickness E1 and the lugs of the second family having a mean thickness E2, the relative variation in thickness (E2−E1/E2) is less than or equal to 25%.

The geometry of the lugs is adapted so as to ensure a constant overlap of the lugs. This adaptation consists in varying the length and the thickness of the lugs in coherent proportions in order to avoid parasitic excitations caused by a lack of uniformity in terms of mass over one revolution of the wheel.

A principle of adapting the thicknesses is to ensure that the ratio of the area of contact of each lug with the surface of a rectangle equal to the half-length of the tread, and with a width equal to the length of a lug, is identical regardless of the lug under consideration.

Another idea for adjusting the geometry of the lug is to achieve a distribution of the mass that is as uniform as possible about the axis of rotation of the tyre. The dynamic unbalance or torque unbalance is a nuisance caused by non-uniformity resulting from asymmetry of mass distribution with respect to the centre of rotation of the tyre without movement of the centre of gravity. This non-uniformity creates, when the tyre is in rotation, centrifugal forces which form a torque with respect to the centre of the casing, and is the origin of a nuisance caused by lateral vibrations.

The non-uniformity in terms of mass also generates a static unbalance resulting in an asymmetry of the mass distribution of the tyre, which corresponds to eccentricity of the centre of gravity in the plane of symmetry of the tyre. The static unbalance creates, when the tyre is in rotation, a centrifugal force which is exerted on the plane of symmetry of the tyre. It brings about vertical vibrations perceived in the vehicle.

For a tread pattern comprising three geometries of lugs A, B, C, classified in increasing order of length, the associated thicknesses are classified in the order 94/100/116 with, for reference, the thickness of the intermediate lug B. The inventors propose that the maximum differences in thicknesses between the end lugs be less than or equal to 25%.

Preferably, the mean inclination angle Ψ of each lug with the circumferential direction (XX') is less than or equal to 50°.

The tyre cures in a mould which reproduces the tread pattern on the tread at the end of curing. For a tread pattern made up of lugs, demoulding is easier when all the lugs make the same angle with the circumferential direction.

Moreover, the trade-off in performance aspects between the traction capability in the fields and the running noise on a road with an asphalt pavement leads to choosing the inclination angle of the lugs with a value less than or equal to 50°. An inclination equal to 90° would be optimal for traction performance, but detrimental in terms of noise, whereas an inclination value of 0° would be prohibitive for traction but optimal for noise.

In one embodiment of the invention, the tread comprises at least two rows of lugs with three families (A, B, C), where the arrangement of the families follows the sequence ABBCCBAABAABBCCBCCBAABC.

The use of three geometries of lugs makes it easier to attenuate noise with more effective scrambling of the excitation signal of the tread pattern compared with a single-spacing tread pattern or even with just two families of lugs. If there were more than three families of lugs, the industrial manufacturing cost of the mould in the design phase and in the use phase would worsen significantly.

For the tyre dimensions under consideration, an arrangement with a row of 23 lugs following the sequence ABBCCBAABAABBCCBCCBAABC moves the vibration frequency of the tread pattern away from that of the cab of the tractor.

In another embodiment of the invention, with the tread comprising at least two rows of lugs with three families (A, B, C) associated respectively with the shortest spacing S, the intermediate space M, and the longest spacing L, the intermediate spacing M is equal to the arithmetic mean of the shortest spacing S and the longest spacing L.

According to the inventors, it is possible to determine arrangements of lugs which avoid the coincidence of harmonics of the tread pattern excited by the ground with the natural modes of the cab of the vehicle for different numbers of lugs. By way of example, a tread having a development at the centre that lies in the range [6300; 6850] mm, and having two rows of N lugs, N ranging from 20 to 25, each of said rows having three families of lugs (A, B, C), has an arrangement of the families of lugs that follows the following sequences for each row:

N=20, the sequence is: BCCCBBAAAAACBBCABBAA
N=21, the sequence is: AABCBCAACBAABCCCBBBAA
N=22, the sequence is: CCABBBB-BAAACCCCBAAAAAB
N=23, the sequence is: ABBCCBAA-BAABBCCBCCBAABC
N=24, the sequence is: BBCCCBBAAAABCC-CAAABBBCAA
N=25, the sequence is: BBCBBAAABCCCBB-BAAAAACCCAA.

Still by way of example, a tread having a development at the centre that this time lies in the range [5500; 6000] mm, and having two rows of N lugs, N ranging from 20 to 25, each of said rows having three families of lugs (A, B, C), has an arrangement of the families of lugs that follows the following sequences for each row:

N=20, the sequence is: BBACBCAAAAABBCCCBAAB

N=21, the sequence is: CCAACBBAABCCCBB-BAAAAB

N=22, the sequence is: CCAABABBBBBC-CAAAAAABCC

N=23, the sequence is: BAAAAAABCCCB-BAAACBBBBCC

N=24, the sequence is: BCCAAAAACCCCBBAAB-BAACBBB

N=25, the sequence is: BBAACC-CAAAAABBBCCCBAAABBC.

Standardized sizes according to the ETRTO, such as 710/70R42 and 650/65R38, have circumferential developments at the centre of the tread that are compatible with the use of these arrangements of lugs of the tread pattern.

Also advantageously, with the tread having a volumetric void ratio TEV equal to the ratio between the total volume of the grooves separating the raised elements and the total volume radially contained between the bottom surface and the tread surface, the volumetric void ratio TEV is between 50% and 80%.

The traction performance during use in the fields entails having a suitable void ratio of around 80% at most. This trade-off encompasses the service life of the tyre with a volume of wearable rubber consistent with the endurance of the tyre.

BRIEF DESCRIPTION OF THE FIGURES

The present invention will be understood better with the aid of the appended figures, which are schematic and not drawn to scale:

FIG. 1-A: illustration of the tread pattern of the tread of a tyre according to the invention.

FIG. 1-B: elements of the tread pattern of the tread of a tyre according to the invention, illustrating the design principle of the tread pattern.

FIG. 1-C: sequence of the tread of a tyre according to the invention with the tread pattern elements.

Figure 1:
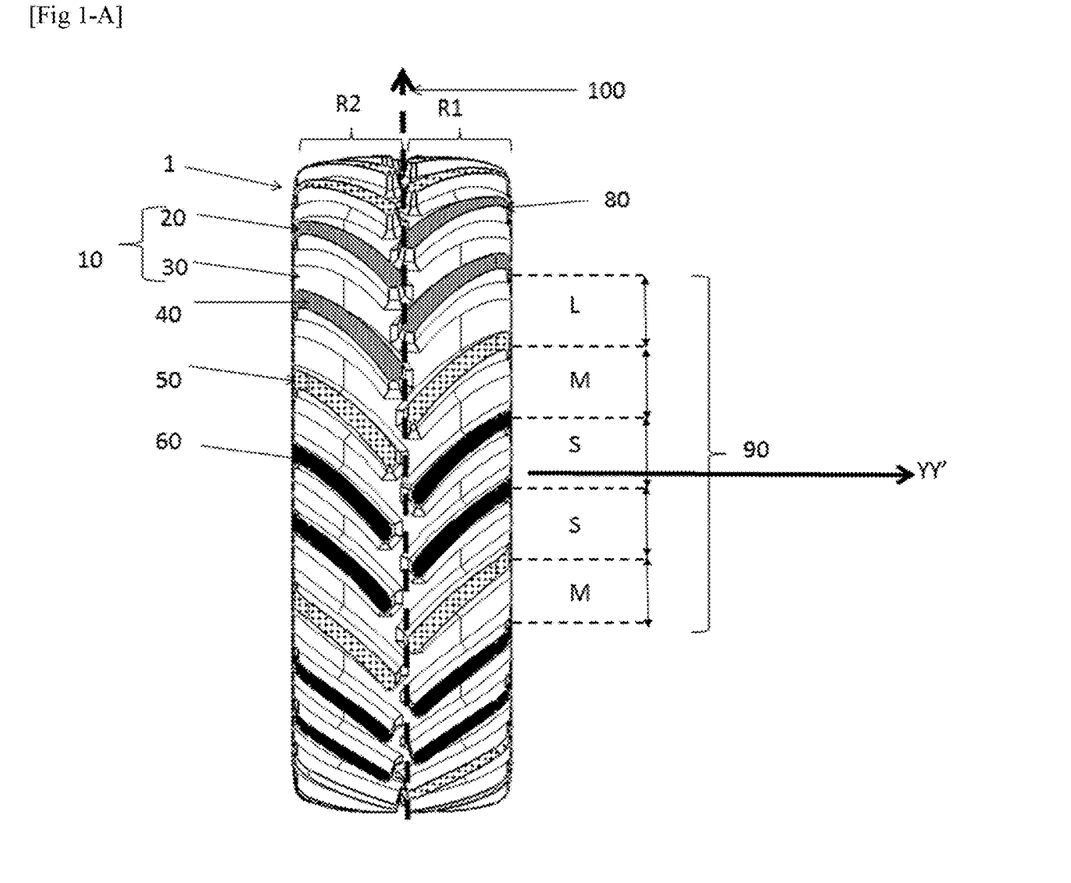

More specifically, FIG. 1-A shows a tyre 1 for a vehicle for agricultural use according to the invention, comprising a tread 10 intended to come into contact with the ground via a tread surface:

the tread 10 comprising raised elements, referred to below as lugs (40, 50, 60), that are separated from one another at least in part by grooves 30 and extend radially towards the outside from a bottom surface as far as the tread surface over a radial height H at least equal to 30 mm and at most equal to the radial thickness $H_{max}$ of the tread 10;

the tread 10 comprising two rows of lugs (R1, R2), a first row R1 being made up of a circumferential distribution of three families of lugs (A, 60), (B, 50) and (C, 40) over one revolution of the tyre; the family (A, 40), which is reproduced with a shortest spacing S, has a length L1, the family (C, 40), which is reproduced with a longest spacing L, has a length L2, and the family (B, 50) is associated with an intermediate spacing M defined as being the arithmetic mean of the spacings S and L;

each lug (A, B, C) therefore being associated respectively with a repetition spacing (S, M, L) as depicted at 90, which illustrates an excerpt of the arrangement of the elements of the tread with the concatenation of the successive spacings.

FIG. 1-B shows tread pattern elements which extend across the entire width of the tread. Each element is formed of two symmetric lugs. The axial ends of a lug, I for the row R1 and I' for the row R2, are positioned with respect to the axial ends of the lug at the centre of the tread (M' and M). The design principle of the tread pattern of the tread necessitates starting from a lug of row R1, then positioning the same lug in row R2 by symmetry with respect to the equatorial plane 100 such that the axial end I' is at a given distance R from the end M of the initial lug of row R1.

FIG. 1-B illustrates the above design principle with a concatenation of several tread pattern elements formed of three families of lug A, B, C.

FIG. 1-C shows the sequence of the tread of a tyre according to the invention with three families of lugs (A, B, C). The lug C has the greatest length L2 and a mean thickness E2, and the lug A has the shortest length L1 and a mean thickness E1. The angle ψ represents the mean inclination of a lug with respect to the circumferential direction.

The invention was studied more particularly in the case of an agricultural tyre of size 710/70R42. For this size, two versions were tested: a first with a single-spacing tread pattern according to the prior art, and a second version according to the invention with three families of lugs A, B and C at variable spacings.

Each lug A, B and C is the basic element of three tread pattern elements of the tread. The respective spacings (S, M, L) are associated respectively with the lugs (A, B, C) such that S<M<L.

Such an example of a tread pattern element is shown in FIG. 1-B with the two basic lugs which are symmetric with respect to the equatorial plane and offset in the circumferential direction. The noses of the lugs converge towards the centre of the tread so as to define the direction of rotation of the tyre, taking the shape of a chevron V.

There are two major types of feature which are caused by the impact of the lugs on the roadway when they are not arranged optimally: whining and beating. These are features, the acoustic power of which is much greater than the mean power of the spectrum and to which the human ear is particularly sensitive.

The timing of the impacts of the tread pattern on the ground on entering the contact patch is given its pattern by the order of succession of the elements. If the elements are all the same size, they follow one another with a perfectly regular rhythm. A single frequency will then be brought about, and this will produce a "whine"-like sound. Having several sizes of element makes it possible to scramble the sound signal emitted by the tread pattern of the tyre, that is to say to reduce the features, so as to tend towards white noise.

Beating, also known as amplitude modulation, occurs when two sounds which have very similar frequencies are emitted simultaneously. If these sounds have comparable amplitudes, they cancel each other out each time they are in phase opposition, and then add together when they are in phase. This forms an amplitude modulation phenomenon.

To optimize the arrangement of the elements so as to reduce the whining and beating noise, each tread pattern element is associated with an elementary, for example sinusoidal, signal. For one complete revolution of the wheel, the associated signal is periodic and results from the sum of the elementary signals.

With the aid of a digital tool, the initial arrangement is optimized with respect to the whining and beating noise by carrying out simulations on different arrangements. Using a Fourier transform on the signal associated with the arrangement, the spectrum of the signal is analysed in the frequency domain. The criteria for stopping the optimization process are linked to the amplitude of the whining and beating features, and to their spread along the frequency axis.

At the end of this iterative approach for the tyre size studied, the total number of tread pattern elements of the tread is established at 23 pairs of lugs arranged in the sequence: ABBCCBAABAABBCCBCCBAABC, around the circumference of the tyre equal to 6465.4 mm. The tread pattern of the tread of the tyre that is created therefore comprises 7 A elements, 9 B elements and lastly 6 C elements. The following table recaps the features of the lugs in at least one row R1 or R2:

TABLE 1

| | Number | Circumferential length of a lug | Mean lug thickness | Circumferential spacing of an element | Inclination |
|---|---|---|---|---|---|
| A elements | 7 | 307.6 | 48.7 | 234.3 | 47.6° |
| B elements | 9 | 332.7 | 52 | 275.7 | 47.6° |
| C elements | 6 | 357.8 | 60.3 | 334.8 | 47.6° |

Figure 2:
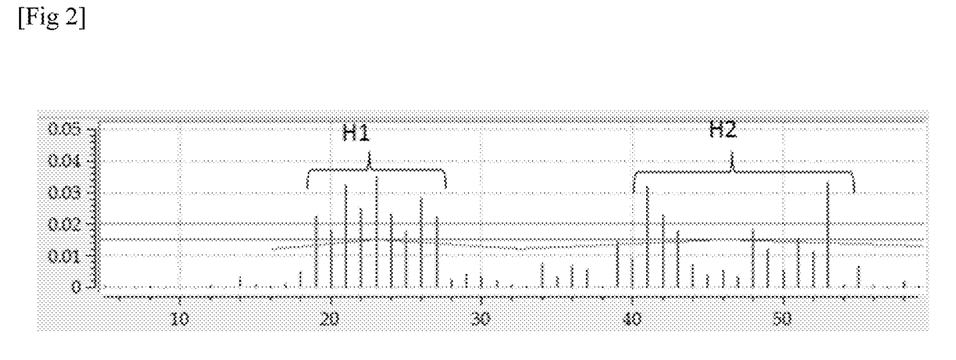
FIG. 2: spectrum of the signal associated with the sequence arrangement: ABBCCBAA-BAABBCCBCCBAABC of the elements of the tread pattern of the tread.

FIG. 2 shows the harmonic spectrum of the arrangement of the tread pattern elements. It reveals two frequency clusters, H1 and H2. The cluster H1 is centred on the harmonic no. 23 linked with the number of pairs of lugs, and the cluster H2, for its part, is linked with each single lug, i.e. 46 lugs. The appearance of the spectrum shows the absence of features and the spread of the radiated-power amplitudes of the clusters H1 and H2, which confirm the optimization of the spectrum linked with the adopted arrangement.

In this example, the maximum height of the lugs $H_{max}$ is 65 mm, and the inclination angle $\Psi$ with respect to the circumferential direction is 47°.

With the volumetric void ratio TEV being equal to the ratio between the total volume of the grooves separating the lugs and the total volume radially contained between the bottom surface and the tread surface, the volumetric void ratio TEV is equal to 80%.

The tyre produced in the size 710/70 R42 was subjected to a test evaluating the noise in the passenger compartment. The test consisted in measuring the noise in the passenger compartment with the aid of two microphones positioned by the driver's ears, on driving at constant speeds of 55/50/45/40 km/h over a road with an asphalt pavement.

The tyre tested was mounted on the rear axle, inflated to a pressure of 1.6 bar, and subjected to a load of 5350 kg. On the front axle, the tyres are smooth following planing.

Figure 3:
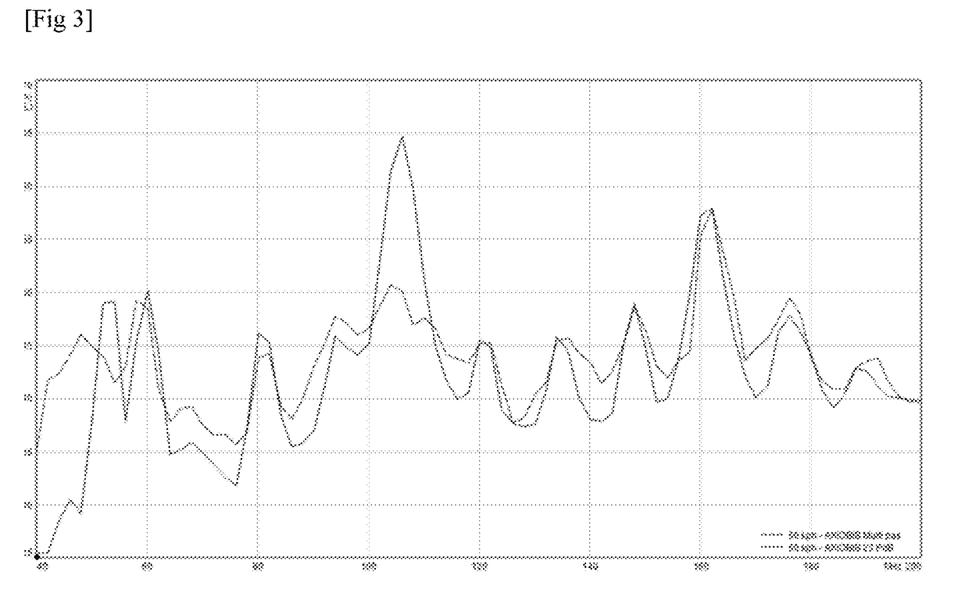
FIG. 3: spectrum of the measured acoustic response of the tyre according to the invention when running on a road with an asphalt pavement at more than 40 km/h.

FIG. 3 shows the result of the test, which is the harmonic spectrum of the signal measured in the passenger compartment of the vehicle. The broken-line curve C2 represents the tyre according to the invention and the solid-line curve C1 represents the reference tyre. In the range of frequencies 100 Hz-130 Hz covered by the resonance of a harmonic of the tread pattern and the natural mode of the cab, the amplitude of the acoustic power is significantly reduced, thereby eliminating the nuisance perceived by the user.

The invention can be easily extrapolated to tyres, for example and non-exhaustively, which equip utility vehicles for mixed use on a road with an asphalt pavement, and/or on an all-terrain road.

The invention claimed is:

1. A tire for a vehicle for agricultural use, comprising a tread intended to come into contact with a ground via a tread surface, the tread comprising:

lugs that are separated from one another at least in part by grooves and extend radially toward an outside from a bottom surface as far as the tread surface over a radial height H at least equal to 30 mm and at most equal to a radial thickness $H_{max}$ of the tread, the lugs being distributed in two circumferential rows;

a first circumferential row being made up of a circumferential distribution of at least two families of lugs distributed periodically around a circumference of the tire, the lugs of a first family being distributed circumferentially with a shortest spacing S, and the lugs of a second family being distributed circumferentially with a longest spacing L, each lug of the first circumferential row being inclined at an angle $\Psi$ with respect to a circumferential direction (XX') of the tire;

the second circumferential row being obtained through symmetry of the first circumferential row with respect to an equatorial plane, passing through the center of the tread and perpendicular to an axis of rotation of the tire, followed by a rotational offset of angle $\theta$ about the axis of rotation, the rotational offset being characterized by an overlap distance between the lugs of the first circumferential row and the lugs of the second circumferential row, defined as being the circumferential distance between an axially outer end of each lug of the first circumferential row and an axially inner end of the lug of the second circumferential row, wherein a ratio S/L of the shortest spacing S of the first family of lugs to the longest spacing L of the second family of lugs lies within the range [0.6; 0.8], wherein the overlap distance between the first and second circumferential rows of lugs is constant around an entire circumference of the tire, and wherein the tread has a development at the center that lies in a range [6300; 6850] mm, and has two rows of N lugs, N ranging from 20 to 25, each of the rows having three families of lugs (A, B, C), wherein an arrangement of the families of lugs follows the following sequences for each row;

N=20, the sequence is: BCCCBBAAAAACBBCABBAA;

N=21, the sequence is: AABCBCAACBAABCCCBBBAA;

N=22, the sequence is: CCABBBBBAAACCCCBAAAAAB;

N=23, the sequence is: ABBCCBAABAABBCCBCCBAABC;

N=24, the sequence is: BBCCCBBAAAABCCCAAABBBCAA; and

N=25, the sequence is: BBCBBAAABCCCBBBAAAAACCCAA.

2. The tire according to claim 1, wherein the overlap distance between the first and second circumferential rows of lugs lies within the range [L/4; L/2].

3. The tire according to claim 1, wherein the rotational angle $\theta$ of the second circumferential row with respect to the first circumferential row lies within a range [5°; 15°].

4. The tire according to claim 1, with the lugs of the first family having a mean thickness E1 and the lugs of the second family having a mean thickness E2, wherein the relative variation in thickness (E2−E1/E2) is less than or equal to 25%.

5. The tire according to claim 1, wherein the mean inclination angle $\Psi$ of each lug with respect to the circumferential direction is less than or equal to 50°.

6. The tire according to claim 1, wherein the tread comprises the rows of N lugs with three families (A, B, C) is associated respectively with the shortest spacing S, the intermediate spacing M, and the longest spacing L, wherein the intermediate spacing M is equal to an arithmetic mean of the shortest spacing S and the longest spacing L.

7. The tire according to claim 1, wherein the tread has a volumetric void ratio TEV equal to a ratio between a total volume of the grooves separating the lugs and a total volume radially contained between the bottom surface and the tread surface, and wherein the volumetric void ratio TEV is between 50% and 80%.

* * * * *